United States Patent [19]
Dickey et al.

[11] Patent Number: 4,764,950
[45] Date of Patent: Aug. 16, 1988

[54] SNAP-ON NETWORK INTERFACE UNIT

[75] Inventors: Larry W. Dickey, Hackettstown; Philip Hughes, Randolph, both of N.J.

[73] Assignee: American Telephone & Telegraph Company, AT&T Bell Laboratories, Murray Hill, N.J.

[21] Appl. No.: 119,217

[22] Filed: Nov. 4, 1987

Related U.S. Application Data

[63] Continuation of Ser. No. 945,215, Dec. 19, 1986, abandoned, which is a continuation-in-part of Ser. No. 788,259, Oct. 17, 1985, abandoned.

[51] Int. Cl.⁴ ............................................. H04M 1/24
[52] U.S. Cl. ...................................... 379/29; 379/429; 361/419
[58] Field of Search ...................... 379/29, 26, 22, 429, 379/434, 442, 1, 399, 397, 387, 451, 453; 361/426, 333, 334, 358, 380, 419

[56] References Cited

U.S. PATENT DOCUMENTS

| | | | |
|---|---|---|---|
| 4,213,013 | 7/1980 | Perna et al. | 179/98 |
| 4,488,008 | 12/1985 | Dellinger et al. | 179/81 R |
| 4,560,839 | 12/1985 | Dillard | 179/175.1 R X |

OTHER PUBLICATIONS

"Teradyne" advertisement-*Telephony*, Jan. 21, 1985, vol. 208, No. 3, pp. 5 and 6.

*Primary Examiner*—Stafford D. Schreyer
*Attorney, Agent, or Firm*—Harry L. Newman

[57] ABSTRACT

Apparatus inserted in series in a transmission line connecting subscriber equipment with a telephone central office and which apparatus is responsive to test signals from the central office to determine whether a fault is located on the office side or the subscriber side of the apparatus is enclosed in a housing. A plurality of leads from the apparatus project through an opening in the housing and the leads are connected to electrical terminals of a connector block. The housing in one embodiment has two spaced apart ribs which are lodged between tabs of fanning strips, located on both sides of the terminals. One of the ribs has an end with a width larger than the rest of the rib so that end projects inward from the fanning strip and prevents accidental dislodging of the housing from the connector block. In a second embodiment, the housing is supported by at least one tab from one fanning strip. Testing of the terminals is effected by removing the housing without disturbing the connection of the leads to the terminals.

20 Claims, 10 Drawing Sheets

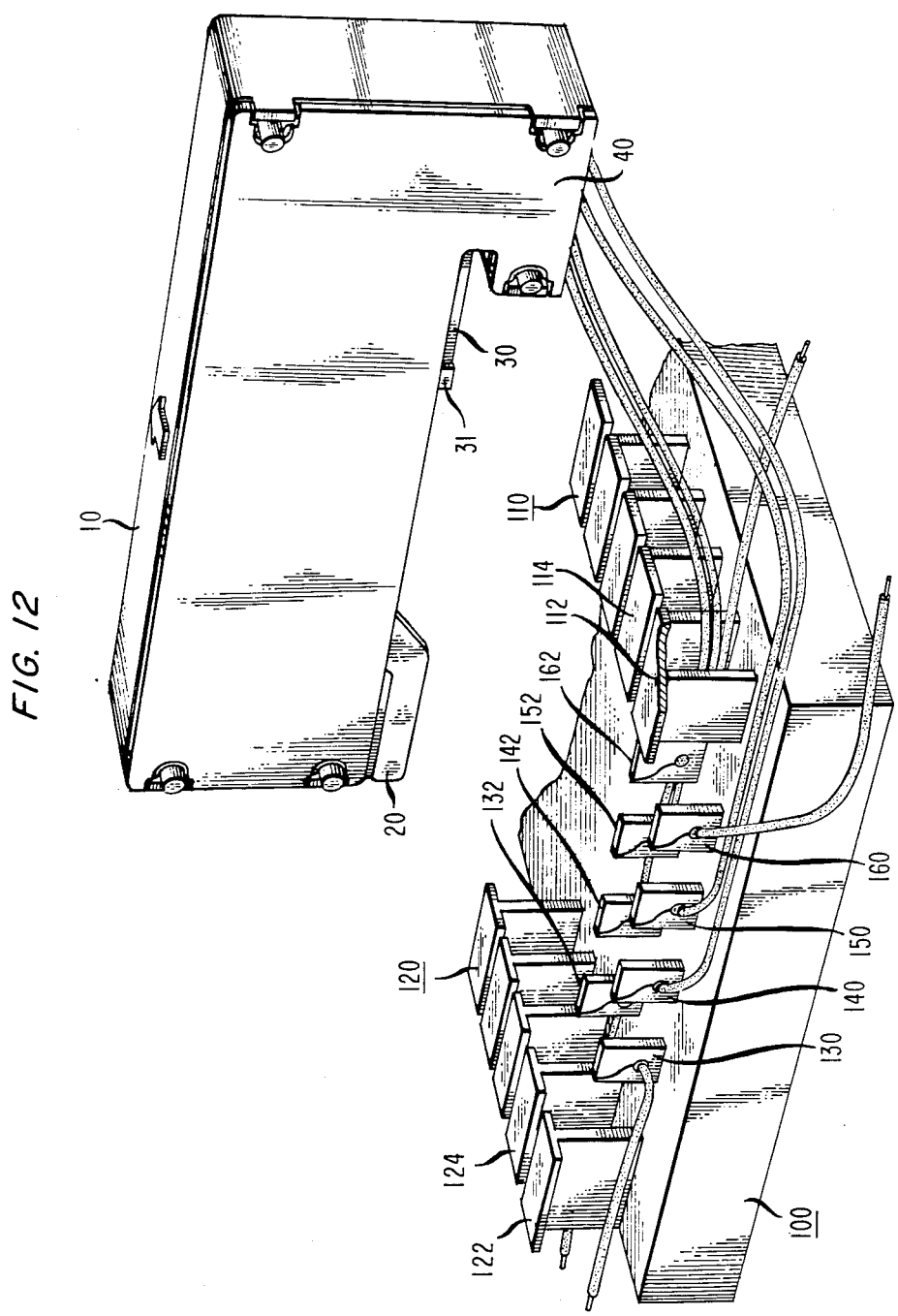

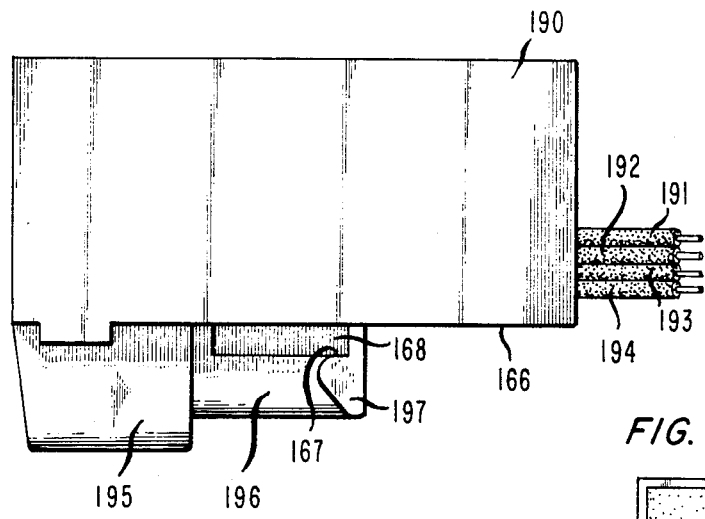
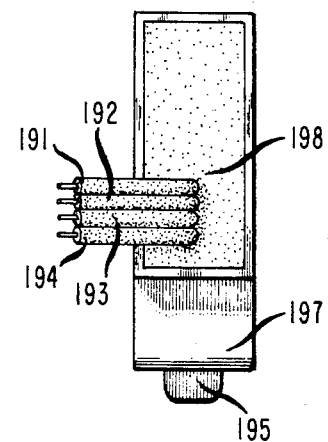
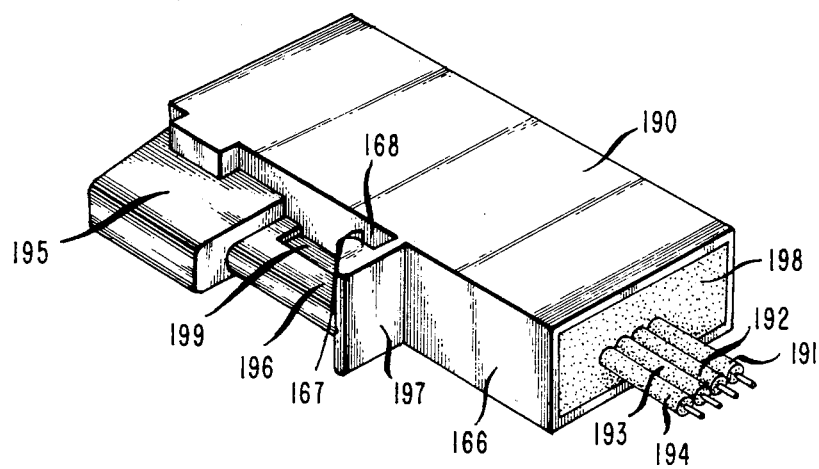

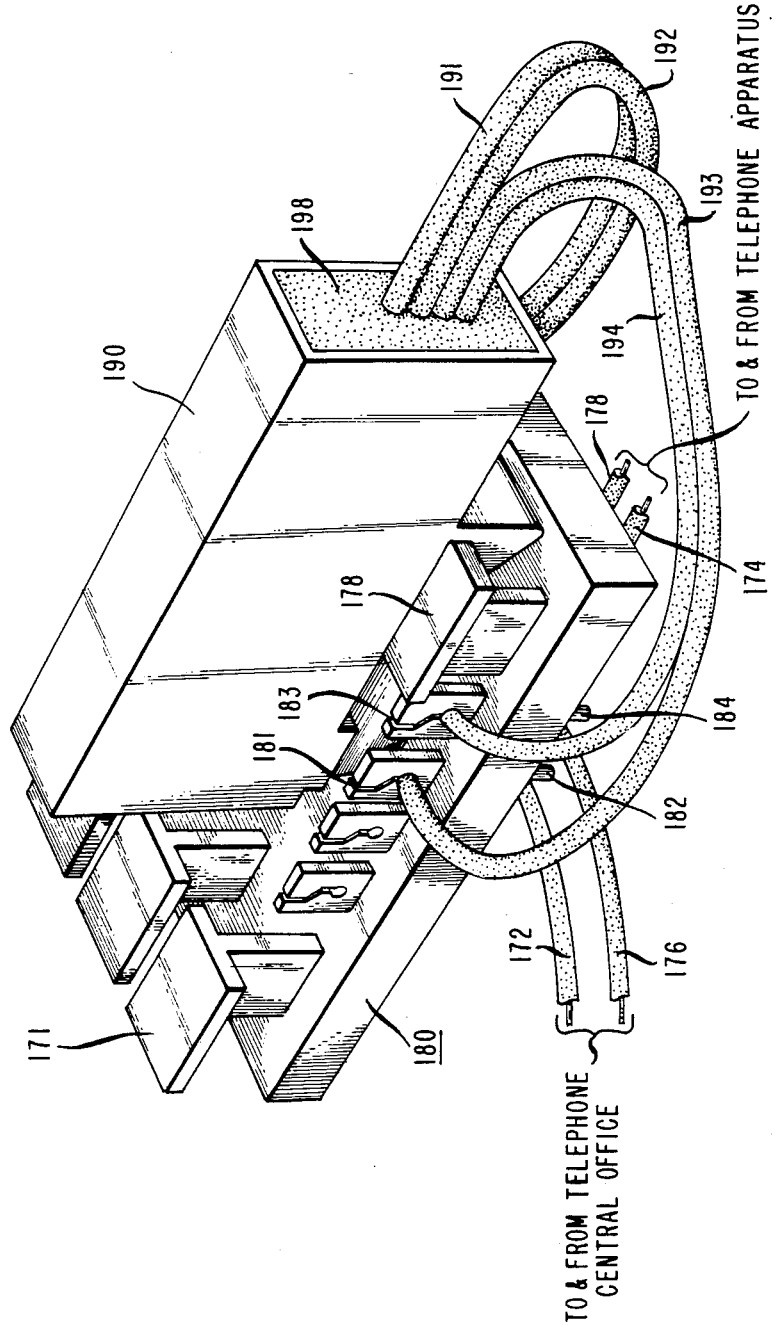

SNAP-ON NETWORK INTERFACE UNIT

This application is a continuation of application Ser. No. 945,215, filed Dec. 19, 1986 which application is a continuation-in-part of application Ser. No. 788,259 filed on Oct. 17, 1985, both abandoned.

TECHNICAL FIELD

This invention relates to interface circuits which are located at the boundary between telephone company owned transmission facility and subscriber owned transmission facility and which are used to identify the responsibility for maintenance of the transmission facility and, in particular, to apparatus for housing such interface circuits.

BACKGROUND OF THE INVENTION

Network interface units (NIU's) are located at the point where telephone company owned transmission facilities meet subscriber owned facilities. These units respond to test signals from a test device usually from the telephone central office side of the unit and identify whether a reported fault is located on the telephone company side or the subscribe side of the unit.

These NIU's may be located in a device as shown in U.S. Pat. No. 4,488,008 issued Dec. 11, 1984 for a single subscriber. Alternatively, many such NIU's may be located in a device as shown in U.S. Pat. No. 4,213,013 issued July 15, 1980 for many subscribers. Yet another device for many subscribers comprises devices which clip on to a cluster of four terminals of a connector block such as the 66 type connector manufactured and sold by AT&T-Technologies, Inc. A problem with a clip-on device, however, occurs when the terminals are bent, in which case the device is rendered inoperable. When the terminals are to be tested, existing test probes cannot be used without removing the device, in which case service is interrupted.

SUMMARY OF THE INVENTION

In accordance with the illustrative embodiment of the present invention, there is disclosed a housing for means responsive to test signals from a telephone line to locate a fault as being on either the telephone side or the subscriber side of the means. The housing is fastened to a connector block having fanning strips on both sides of a plurality of columns of electrical terminals which are arranged also in rows. In the preferred embodiment, each row has four terminals: the first two terminals are connected to each other as are the last two. Two rows are used for a telephone line: one row is for the tip conductor path and the other row is for the ring conductor path. The first terminal in each of the two rows is connected to the ring and the tip conductor of the telephone line. Likewise, the fourth terminal in each of the rows is connected to the tip and ring conductor of the subscriber line.

Four leads from the test responsive means project from the housing. These leads correspond to the tip and ring leads of the telephone and the subscriber line and are terminated on the second and the third terminals of the corresponding rows of terminals, thereby introducing the aforesaid test responsive means between said telephone line and said subscriber line.

The housing has a lower surface from which spaced apart ribs project outwardly therefrom. These ribs are fastened between adjacent tabs of said fanning strips in such a way that the lower surface of the housing clears the top of the terminals. One of the ribs has an end which is wider than the remaining part of the rib for projecting inwards from the fanning strip and for preventing the housing from becoming dislodged from the connector block. The other end of this rib is adjacent to the opening which is provided for the leads and which projects downwards from the aforesaid lower surface and which is located adjacent to a fanning strip on the outside surface thereof. The other rib projects forwardly from the housing and is lodged between two adjacent tabs on one of the fanning strips.

In a second embodiment, the means responsive to test signals is placed within a housing and sealed with a potting compound. Four leads from the test signals responsive means are terminated on four different split barrel terminals. These terminals, housed within a mounting block in rows and columns, have wiring posts protruding from the rear surface of a mounting block. The tip and ring leads from a telephone central office and from a telephone station apparatus are terminated on the wiring posts corresponding to the leads from the test signals responsive means in such a way that the test signals responsive means is introduced in series between the telephone central office and the telephone station apparatus.

The housing, in the second embodiment, has a lower surface from which projects an elongated rib having front and rear sections. The rear section has a member that anchors on to at least one tab of a fanning strip from the outer edge and from the bottom surface. The housing, pivoting about the fanning strip, is then urged downwards so that the front section of the rib is lodged within a pair of split barrel terminals. The front section is wider than the central section of the rib and fits snugly between two of the terminals.

This invention is advantageous in using existing connector blocks. The housing is installed without disturbing existing service. By using leads which are terminated on quick connect terminals, the housing may be pivoted out from the fanning strips to permit testing of the terminals.

BRIEF DESCRIPTION OF THE DRAWING

FIG. 12 shows the housing removed from the connector block for testing;

FIG. 13 shows an elevation view of a housing in a second embodiment;

FIG. 14 shows an end view of the housing of FIG. 13;

FIG. 15 shows an isometric view of the housing of FIGS. 13 and 14;

FIG. 17 shows the housing of FIG. 16 installed on a connecting block.

DETAILED DESCRIPTION

Figure 1:
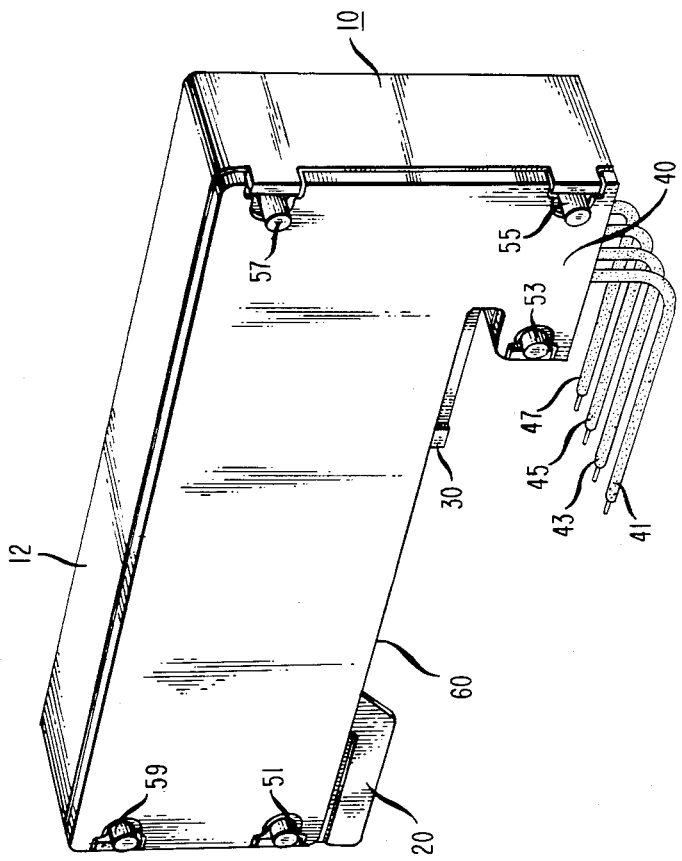
FIG. 1 shows an isometric view of the housing for a snap-on network interface unit.
Figure 2:
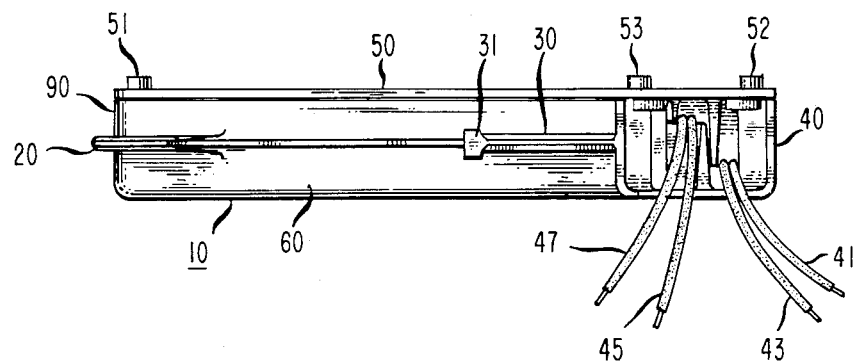
FIG. 2 shows a plan view of the housing.
Figure 3:
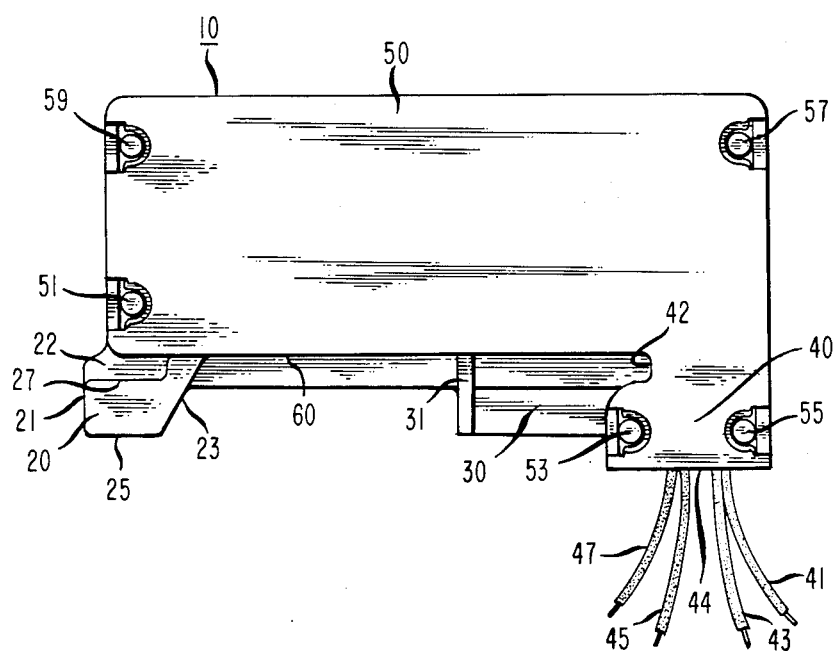
FIG. 3 shows an elevation view of the housing.

Referring to FIGS. 1, 2 and 3, there is shown housing 10 for enclosing a network interface unit (not shown) which is used to identify whether a fault is located in a telephone company owned facility or a subscriber owned facility.

Figure 10:
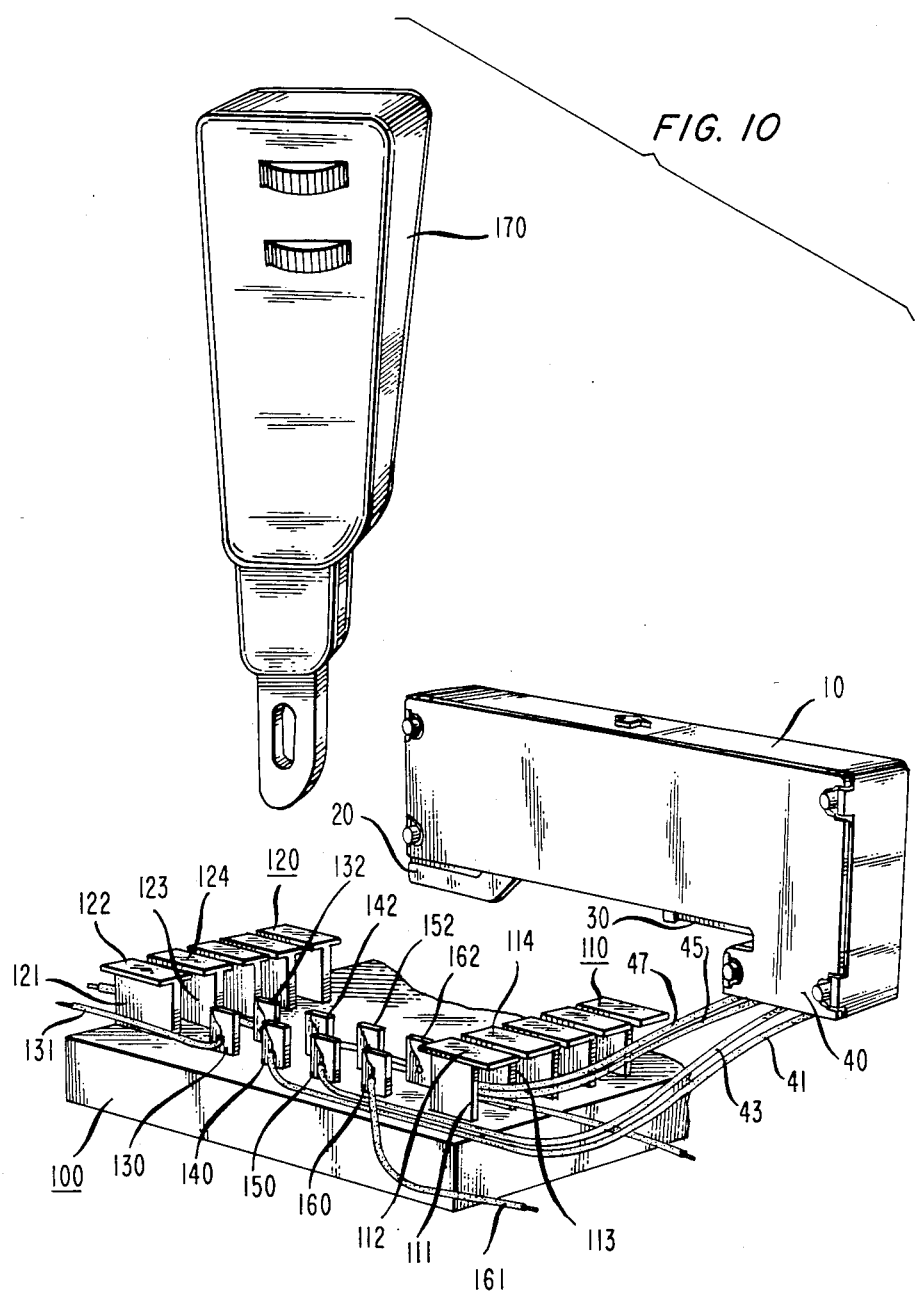
FIG. 10 shows the leads of the network interface unit being terminated on a connector block.

Housing 10 has from its lower surface 60 a projection 40 to funnel a plurality of leads 41, 43, 45 and 47 from the network interface unit to be connected to terminals 140, 142, 150 and 152 on connector block 100 of FIG. 10. Lead 41 is the telephone line ring lead, lead 43 is the subscriber line ring lead, lead 45 is the telephone line tip lead, and lead 47 is the subscriber line tip lead. The connection of these leads to the aforesaid terminals will be described hereinbelow.

Projecting downwards from lower surface 60 are two spaced apart, collinear ribs 20 and 30 which are used to secure housing 10 to connector block 100 of FIG. 11, as disclosed hereinbelow. Upper surface 12 of housing 10 has an arrow as shown in FIG. 10, or some other suitable indicia for indicating the correct orientation of housing 10 for its fastening to connector block 100 of FIG. 10.

Housing 10 comprises six major sides, excluding the surfaces of ribs 20 and 30 and of projection 40 from lower surface 60. Five of these sides define container 90 into which the aforesaid network interface unit is placed. Container 90 has a plurality of posts 51 through 59 projecting outwardly therefrom. Cover 50 is the sixth side of housing 10. Cover 50 has a plurality of apertures corresponding to the aforesaid posts 51 through 59. After cover 50 is placed over the posts to close housing 10, posts 51 through 59 are heat staked. Posts 51 through 59 being made from a plastic, as are container 90 and cover 50, heat staking causes posts 51 through 59 to melt and fuse with cover 50, creating a sealed unit.

Figure 4:
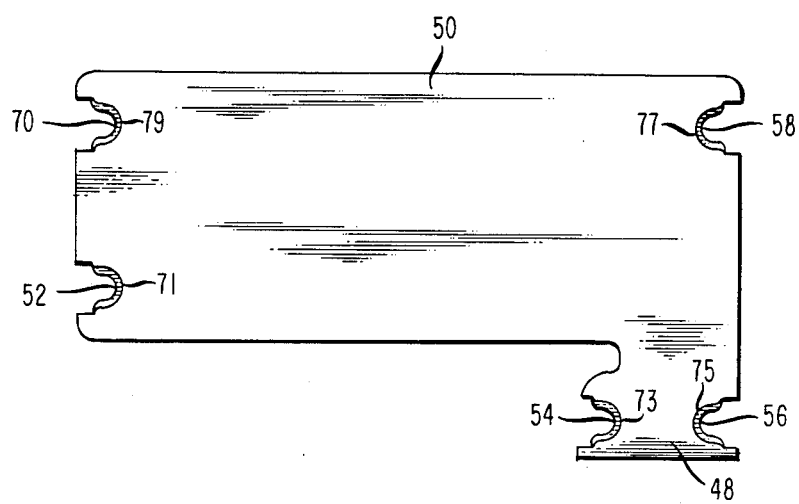
FIGS. 4, 5 and 6 show the elevation, plan and end elevation views of the cover for the housing.
Figure 5:
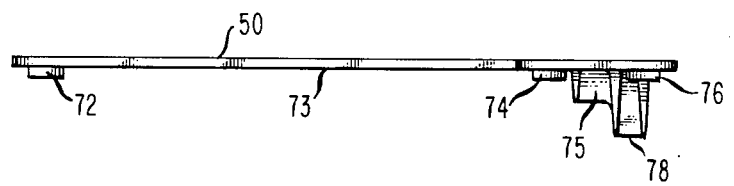
Figure 6:
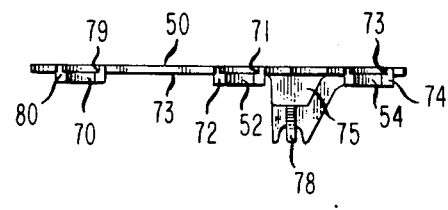

Referring to FIGS. 4, 5 and 6, there are shown details of cover 50 which comprises the sixth side of housing 10. Apertures 52, 54, 56, 58 and 70 correspond with posts 51, 53, 55, 57 and 59 of FIGS. 7 or 10, respectively. Each aperture 52, 54, 56, 58 and 70 has a corresponding depression 71, 73, 75, 77 and 79 having a surface slightly below that of cover 50. When posts 51 through 59 are heat staked the material therefrom will flow into the corresponding depression and fill it, creating a bond between each post and cover 50 adjacent thereto.

There is shown projection 48 which corresponds to projection 40 of FIG. 10. On surface 73, to be located on container 90, there are collar 80 surrounding aperture 70, collar 72 surrounding aperture 52, collar 74 surrounding aperture 54, collar 76 surrounding aperture 56, and a collar surrounding aperture 58 (not shown). Each collar provides support for cover 50 and prevent it from melting when hot material from posts 51 through 59 make contact after heat staking.

There are shown plates 75 and 78 perpendicular to each other. These plates, to be described hereinbelow, cooperate with elements 91, 93 and 95 of FIGS. 7 and 8 to provide channels for the aforesaid leads 41 through 47.

Figure 7:
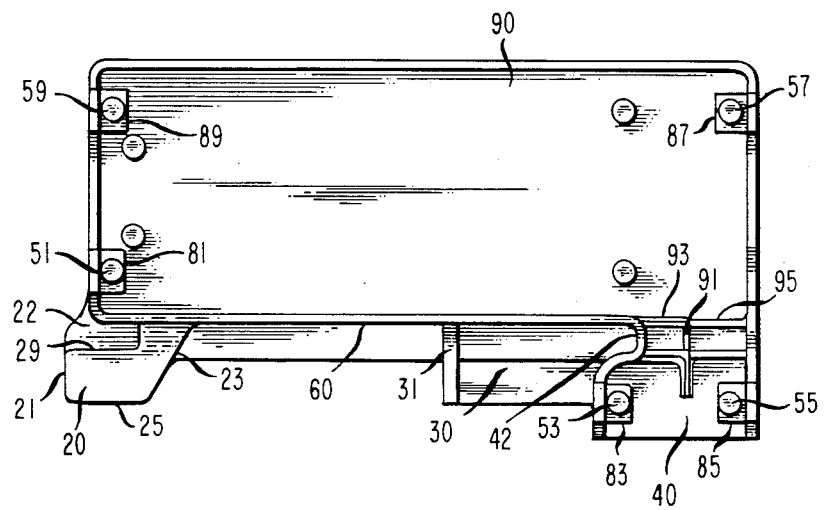
FIGS. 7, 8 and 9 show the elevation, plan and end elevation views of the housing with the cover removed.
Figure 8:
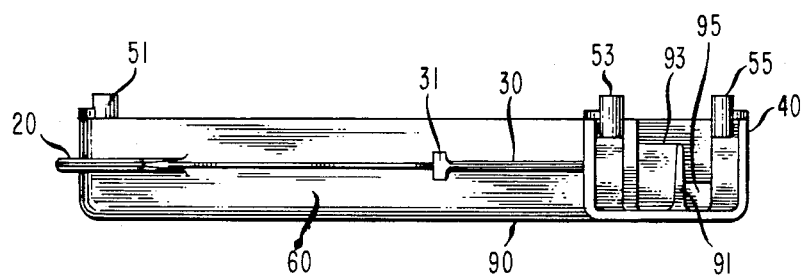
Figure 9:
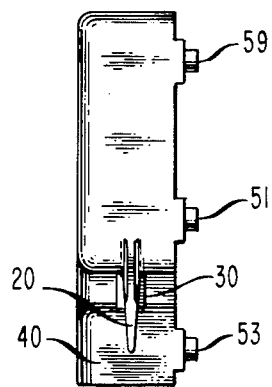

Referring to FIGS. 7, 8 and 9, there are shown details of container 90. Each post 51 through 59 is enclosed in a solid column 81 through 89, to provide support and prevent buckling. Projection 40 has near lower surface 60 elements 91, 93 and 95. Element 76 of FIG. 5 and element 91 of FIGS. 7 and 8 lie in substantially the same plane so as to create two channels. A first channel is formed by surface 75 of cover 50 of FIGS. 5 and 6 and element 93. The second channel is formed by element 78 of FIGS. 5 and 6 and element 95 of FIG. 7. The two channels are zig-zagged, and lie in two different planes. Leads 45 and 47 emanate from the first channel and leads 41 and 43 emanate from the second channel.

Rib 20 has a lower edge 25 which is substantially parallel to lower surface 60 of housing 10. Rib 20 becomes wider from edge 25 until an upper edge 29 is reached. At upper edge 29, the width of rib 20 decreases suddenly and is connected to lower surface 60 of housing 10 by a plate 22. Lower edge 25 of rib 20 is connected with lower surface 60 of housing 10 by sloping edge 23. A forward edge 22 which is substantially perpendicular to lower edge 25 projects forwardly from housing 10. Rib 20 is used to secure housing 10 between two adjacent tabs of fanning strip 120 of FIG. 11.

Rib 30 comprises one end 31 which is wider than the rest of rib 30. The other end of rib 30 is secured to projection 40 from lower surface 60 of housing 10. Rib 30 is secured between two adjacent tabs 112 and 114 of fanning strip 110 as shown in FIGS. 10, 11 and 12. End 31 of rib 30 is slightly wider than walls 111 and 113 of adjacent tabs 112 and 114 of FIG. 10 so that when housing 10 is snapped into place, end 31 of rib 30 projects past fanning strip 110 inwardly and holds housing 10 in place and prevents it from becoming disengaged accidentally.

Referring more particularly to FIG. 10, there is shown a connector block 100, such as the 66 type connector block manufactured and sold by AT&T-Technologies, Inc., comprising two fanning strips 110 and 120. Each fanning strip is made from a plastic and comprises a plurality of tabs which are resilient. Fanning strip 110 for example comprises a plurality of tabs 112 and 114 supported by walls 111 and 113 respectively. Likewise, fanning strip 120 comprises a plurality of tabs 122 and 124 supported by walls 121 and 123 repectively.

Connector block 100 also comprises between the aforesaid fanning strips 110 and 120, a plurality of columns of electrical terminals, the last terminal from each being elements 130, 140, 150 and 160. Furthermore, one terminal from each column and a tab from each fanning strip form a row. Referring to the row comprising terminals 130, 140, 150 and 160 between tabs 122 and 112, terminals 130 and 140 are interconnected at its base, not seen in FIG. 10. Likewise, terminals 150 and 160 are interconnected though not shown in FIG. 10. These interconnections are representative of the remaining rows of terminals.

A conductor 131 from a telephone company transmission line is terminated on terminal 130 using quick connect tool 170. Likewise, conductor 161 from a subscriber transmission line is terminated on terminal 160 using quick connect tool 170. Telephone line ring lead 41 is terminated on terminal 140 using tool 170, while subscriber line ring lead 43 is terminated on terminal 150 using tool 170. This row of terminals 130 through 160 is referred to as the ring row.

In a similar manner, a telephone line tip conductor (not shown) is terminated on terminal 132 while a subscriber line tip conductor (not shown) is terminated on terminal 162. Telephone tip lead 45 is terminated on terminal 142 while subscriber tip lead 47 is terminated on terminal 152. This row of terminals 132 through 162 is referred to as the tip row. For each telecommunications line, there are both tip and ring conductors. Thus, two rows of terminals are needed to provide a link between a telephone line and a subscriber line. Viewed another way, the network interface unit is interposed in series in a telecommunications line between a telephone office (not shown) and subscriber equipment (not shown).

Because the width of rib 20 increases from lower edge 25 gradually to upper edge 29, when rib 20 is inserted between tabs 122 and 124, for example, rib 20 acts as a wedge to separate resilient tabs 122 and 124. After rib 20 has been inserted sufficiently deep between tabs 122 and 124, tabs 122 and 124 are released because of thin plate 22 of rib 20. Rib 20 is secured between walls 121 and 123 of tabs 122 and 124.

Likewise, rib 30 acts as a wedge when inserted between resilient tabs 112 and 114 to separate them. End 31 of rib 30 is wider than the rest of rib 30 so that if end 31 becomes lodged between tabs 112 and 114, after rib 30 has been inserted sufficiently deep between tabs 112 and 114, tabs 122 and 124 will be released when end 31 clears the tabs.

Referring to FIGS. 4, 7, 10 and 11, it can be seen that lower surface 60 of housing 10 clears the tops of terminals 130 through 160 and terminals 132 through 162. Furthermore, projection 40 is located adjacent to and on the exterior surface of fanning strip 110. Projection 40 has a recess 42 adjacent to lower surface 60 so that the exterior side of tabs 112 and 114 of fanning strip 110 is received therewithin.

Figure 11:
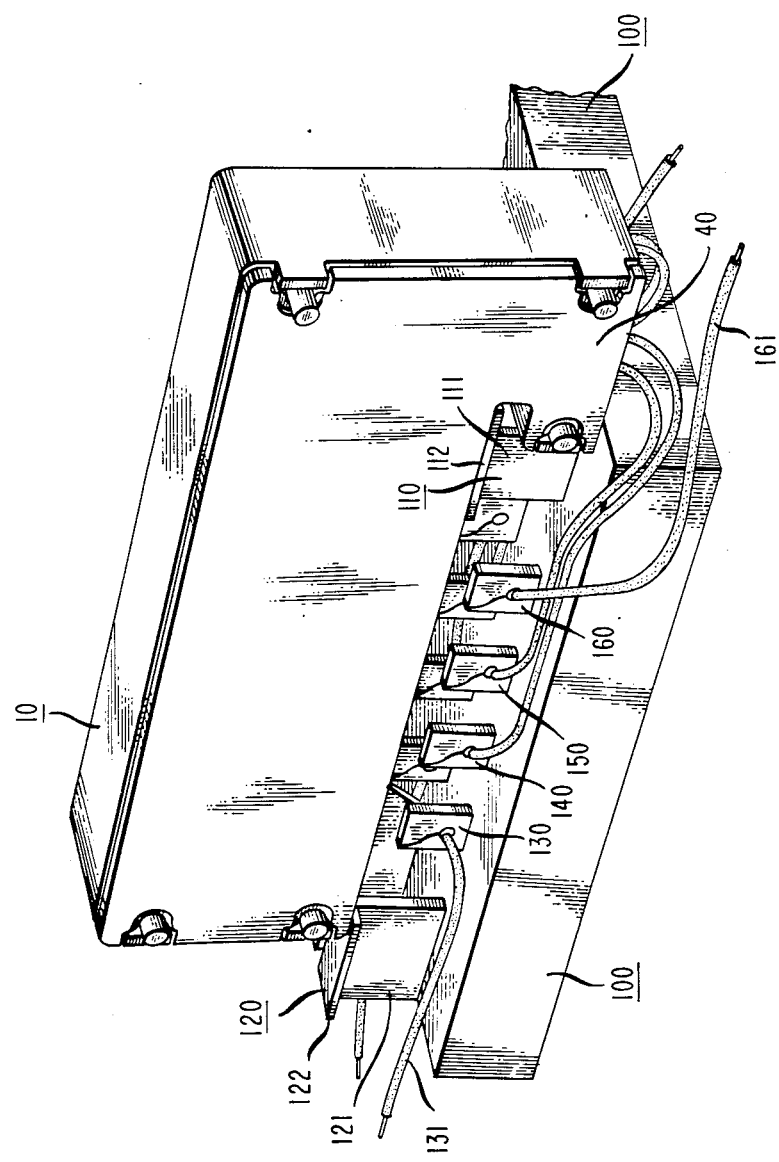
FIG. 11 shows the network interface unit and its housing in the assembled state mounted on the connector block.

When housing 10 is securely in position, as shown in FIG. 11, end 31 will clear the inner surface of tab 112 and wall 111 facing terminal 160. Thus end 31 prevents housing 10 from becoming dislodged from connector block 100 accidentally.

Referring to FIG. 12, there is shown housing 10 removed from connector block 100 by pivoting housing 10 about fanning strip 110. In this position, terminals 130 through 160 and 132 through 162 are exposed for testing.

A second embodiment of housing for means that is responsive to test signals is shown in FIGS. 13, 14 and 15. Although test signals are sent from a telephone central office at the present time, the test signals could also be sent from a telephone station apparatus.

Means that is responsive to test signals is placed within housing 190 and sealed with potting compound 198. Lead 191, 192, 193 and 194 from the test signal responsive means project outwards from potting compound 198. Rib 196 projects downwardly from lower surface 166 of housing 190. Rib 196 has a front section 195 and a rear section 197. Front section 195, however, is narrower than rear section 197. Upper surface 167 of rear section 197 of rib 196 is substantially parallel to lower surface 166 of housing 190, leaving a space 168. This space 168 permits housing 190 to be anchored by at least one tab of a fanning strip to be described more fully hereinbelow with reference to FIGS. 16 and 17.

Front section 195 is wider than rib 196. Front section 195 is just wide enough to fit snugly between two split terminals, shown in FIG. 16 hereinbelow, and be held therebetween by friction and by pressure from the two terminals.

Figure 16:
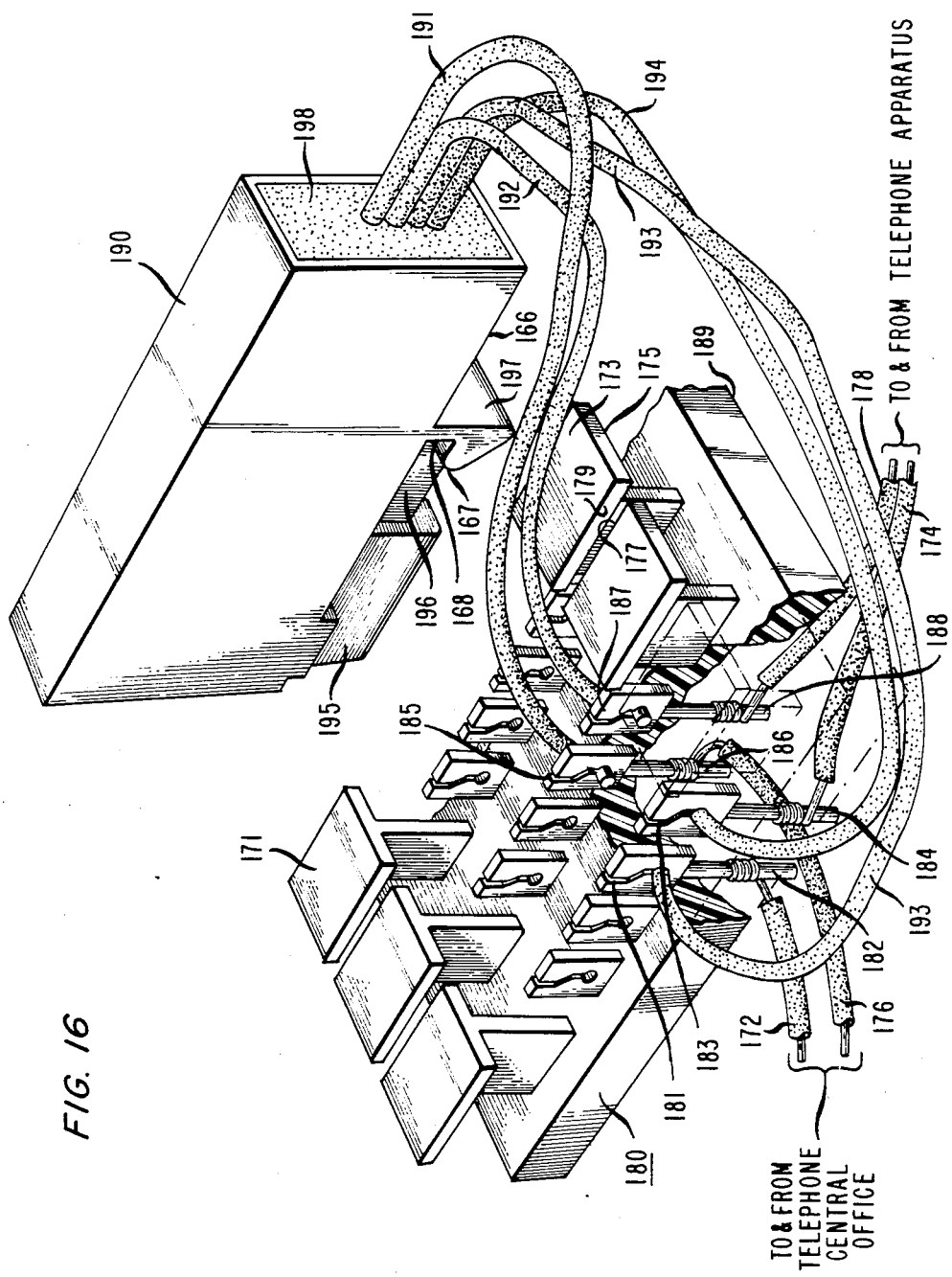
FIG. 16 shows leads from the test signals responsive means terminated on terminals.

Referring to FIGS. 16 and 17, there is shown connector block 180 having a plurality of terminals 181, 183, 185 and 187 that are arranged in rows and in columns. Each terminal has a wiring post projecting from rear surface 189 of connector block 180. For example, wiring post 182 of terminal 181 and wiring post 184 of terminal 183 are seen in the partial section of connector block 180.

Tip and ring electrical conductors 176 and 172 to and from a telephone central office, not shown, are terminated on wiring posts 186 and 182, respectively, of terminals 185 and 181, respectively. Likewise, tip and ring electrical conductors 178 and 174 to and from a telephone station apparatus, not shown, are terminated on wiring posts 188 and 184 of terminals 187 and 183, respectively.

Tip and ring electrical conductors 191 and 193 from test signal responsive means in housing 190 are terminated on split terminals 185 and 181, respectively. Likewise, tip and ring electrical conductors 192 and 194 are terminated on split terminals 187 and 183, respectively. It can be seen that an electrical path is established from the telephone central office through tip conductor 176, terminal 185, tip conductor 191, the test signal responsive means in housing 190, tip conductor 192, terminal 187, tip conductor 178 and telephone station apparatus. Likewise, an electrical path is established between telephone central office, ring conductor 172, terminal 181, ring conductor 193, test signal responsive means in housing 190, ring conductor 194, terminal 183, ring conductor 174 and telephone station apparatus.

The columns of terminals in connector block 180 are shown flanked by two columns of fanning strip tabs 171 and 173. There exist some connector blocks, however, having only one column of fanning strip. The lower surface of outer edge 175 of fanning strip 173, for example, anchors space 168 between upper surface 167 of rear section 197 and lower surface 166 of housing 190. In the preferred embodiment, edges 177 and 179 of adjacent tabs will rest within depression 199 of rib 196 of housing 190. Thereafter, housing 190 pivots about the outer edge of fanning strip 173 and is installed by seating front section 195 between terminals 181 and 185, and between terminals 183 and 187. The friction between each surface of front section 195 and terminals 181 and 185, and furthermore, the seating action of edges 177 and 179 of the adjacent tabs within recessed areas 199 of housing 190 combined with the retention of upper surface 167 of rear rib section 197 and lower surface 166 of housing 190 retain housing 190 in position.

What is claimed is:

1. Test apparatus for insertion in a telephone line between a telephone central office and terminal apparatus for locating a fault as being either on the telephone central office side or on the terminal apparatus side of said test apparatus, said test apparatus being used in conjunction with a connector block, the connector block comprising a plurality of electrical terminals arranged in columns and having at least one column of fanning strips located adjacent to one of the columns of electrical terminals, each fanning strip comprising a plurality of tabs, the tabs and terminals being arranged in rows, the apparatus comprising means responsive to test signals on the telephone line from either said central office side or said terminal apparatus side of the test apparatus, said means comprising a plurality of leads projecting outwardly therefrom, housing for said test responsive means, and the leads from said test signals responsive means being terminated on said terminals, one lead of said test signal responsive means to a terminal.

2. The test apparatus of claim 1 wherein said housing for said test responsive means is supported by at least one of said tabs.

3. The test apparatus of claim 2 wherein the test signals responsive means comprises a circuit board which is placed within said housing and then said housing being filled with a potting compound.

4. The test apparatus of claim 3 wherein the test leads from said test signals responsive means comprise a central office tip lead, a central office ring lead, a terminal apparatus tip lead, and a terminal apparatus ring lead, each of the leads being terminated at a separate terminal, the tip leads being in a separate row from the ring leads, the central office tip and ring leads from the test signal responsive means being in a first one of said columns of terminals being connected thereat to the corresponding tip and ring leads from the central office side of the telephone line and the terminal apparatus tip and ring leads from the test signal responsive means in a second one of said columns of terminals being connected thereat to the corresponding tip and ring leads from the terminal apparatus side of the telephone line.

5. The test apparatus of claim 4 wherein said housing has a lower surface, a rib having front and rear ends projecting downwardly from said housing, said rear end being anchored beneath at least one of said tabs and said front end being lodged between two rows of terminals in said first and second columns of terminals.

6. Test apparatus of claim 2 wherein four columns of said electrical terminals are located between two columns of fanning strips, the first and second terminals in each row being interconnected and the third and fourth terminals in each row being interconnected, two of the rows being used to establish a connection between said central office side and said terminal apparatus side of the telephone line, one of said two rows being the tip row and the other of the two rows being the ring row, said first terminal in each of said ring row and of said tip row being connected to corresponding ring and tip conductors of the central office side of said telephone line, said fourth terminal in each ring row and of said tip row being connected to corresponding ring and tip conductors of the terminal apparatus side of said telephone line.

7. Test apparatus of claim 6 wherein said leads from said test signal responsive means comprises a central office ring lead, a central office tip lead, a terminal apparatus ring lead and a terminal apparatus tip lead, said central office ring lead being connected to said second terminal of said ring row, said central office tip lead being connected to said second terminal of said tip row, said terminal apparatus ring lead being connected to said third terminal of said ring row, and said terminal apparatus tip lead being connected to said third terminal of said tip row.

8. A snap-on network interface unit comprising:
means responsive to a test signal generated to locate a fault;
means for supporting the test signal responsive means, the support means including means adapted to engage a fanning strip on a connector block, the engaging means being configured to cooperate with the fanning strip to secure the support means to the connector block.

9. A snap-on network interface unit as in claim 8 wherein the support means includes means adapted to engage a pair of spaced fanning strips on a connector block, the engaging means comprising a pair of spaced ribs configured to cooperate with the fanning strip to secure the support means to the connector block.

10. A snap-on network interface unit as in claim 8 wherein the support means includes means adapted to engage both a fanning strip and terminals on a connector block, the engaging means being configured to cooperate with the fanning strip and the terminals to secure the support means to the connector block.

11. A snap-on network interface unit as in claim 8 wherein the test signal responsive means includes a plurality of leads for connecting the signal responsive means to an external circuit and wherein the support means comprises a multi-sided container within which the test signal responsive means is accommodated, the container having an opening in one side through which the leads of the test signal responsive means extend.

12. A snap-on network interface unit as in claim 11 wherein the one side having the opening for the leads includes a projection within which the opening is located, one side of the projection defining a recess adapted to accommodate a portion of the fanning strip of the connector block.

13. Test apparatus comprising:
a circuit for insertion in a telephone line between a telephone central office and terminal apparatus, the circuit being responsive to a test signal for locating a fault as being either on the telephone central office side or the terminal apparatus side of the test apparatus; and
a housing for the circuit, the housing adapted for use in conjunction with a connector block comprising a plurality of electrical terminals arranged in columns and having at least one column of fanning strips located adjacent to one of the columns of electrical terminals, each fanning strip comprising a plurality of tabs, the tabs and terminals being arranged in rows, the housing being configured to be supported by at least one of the tabs of the fanning strip.

14. The test apparatus of claim 13 wherein the circuit includes a plurality of leads for termination on the terminals, one lead to a terminal.

15. The test apparatus of claim 13 wherein the housing has a rib having front and rear ends projecting downwardly from the housing, the rear end being configured to be anchored beneath at least one of the tabs of the connector block and the front end being configured to be lodged between two rows of terminals of the connector block.

16. The test apparatus of claim 13 wherein the housing includes six major sides, five of the sides defining an open container in which the circuit is housed, the container including a plurality of posts, the sixth side having a plurality of apertures corresponding to the posts, the sixth side closing the open container to form the housing, the housing having a lower surface, the lower surface including a projection having an opening for the leads of the circuit, the opening being located adjacent to a first one of the columns of the fanning strips when the housing is supported on the connector block.

17. The test apparatus of claim 13 wherein the housing has a lower surface and the lower surface of the housing is configured to clear the tops of the electrical terminals of the connector block when the housing is supported on the connector block.

18. The test apparatus of claim 13 wherein the housing has a lower surface and the lower surface of the housing has spaced-apart substantially aligned first and second ribs depending therefrom.

19. The test apparatus of claim 18 wherein the first rib is located adjacent to one end of the housing, the first rib being configured to be positioned between two adjacent tabs of the first column of fanning strips.

20. The test apparatus of claim 19 wherein the second rib is adjacent to a depending projection adjacent to the other end of the housing, one side of the projection having a recess adapted to accommodate a portion of the fanning strip of the connector block.

* * * * *